United States Patent [19]
Kraus et al.

[11] 3,821,360
[45] May 28, 1974

[54] PREPARATION OF NON-SOLVATED ALUMINUM HYDRIDE

[75] Inventors: Theodore C. Kraus, Cheshire; James A. Scruggs, West Haven; Samuel I. Trotz, Mount Carmel, all of Conn.

[73] Assignee: Olin Mathieson Chemical Corporation, New Haven, Conn.

[22] Filed: Mar. 2, 1962

[21] Appl. No.: 177,704

[52] U.S. Cl. .............................................. 423/645
[51] Int. Cl............................................ C01b 6/00
[58] Field of Search ................ 23/14, 204; 423/645

[56] References Cited
FOREIGN PATENTS OR APPLICATIONS
860,377  2/1961  Great Britain OTHER PUBLICATIONS
Wiberg, AEC-tr. 1931, New Results in Preparative Hydride Research, Technical Information Service, Oak Ridge, Tenn. 1954.

*Primary Examiner*—Leland A. Sabastian
*Attorney, Agent, or Firm*—Eugene Zagarella, Jr.

EXEMPLARY CLAIM

1. A method for the preparation of non-solvated aluminum hydride which comprises (A) reacting a compound selected from the group consisting of mercuric chloride, mercurous chloride, ferric chloride, zinc chloride, cupric chloride and cuprous chloride with an excess of an alkali metal aluminum hydride of the formula:

$MAlH_4$, wherein M is an alkali metal selected from the group consisting of lithium, sodium and potassium and in the presence of a lower dialkyl ether of the formula:

$R_1OR_2$, wherein $R_1$ and $R_2$ are alkyl radicals having from one to five carbons atoms, the molar ratio of the said compound reacted with the said alkali metal aluminum hydride being within the range of from about 0.49 to about 0.17, (B) separating liquid and solid phases of the resulting reaction mixture, (C) recovering from the liquid phase a solvated aluminum hydride product containing the unreacted alkali metal aluminum hydride, (D) heating the said solvated aluminum hydride product at a temperature of from about 20°C. to about 150°C. and for a period of time sufficient to remove the lower dialkyl ether associated with the aluminum hydride whereby a non-solvated aluminum hydride product containing the unreacted alkali metal aluminum hydride is obtained and (E) recovering the non-solvated aluminum hydride.

7 Claims, No Drawings

PREPARATION OF NON-SOLVATED ALUMINUM HYDRIDE

This invention relates to the preparation of non-solvated aluminum hydride. More particularly, this invention relates to a method in which mercuric chloride, mercurous chloride, ferric chloride, zinc chloride, cupric chloride or cuprous chloride is reacted with an excess of an alkali metal aluminum hydride in the presence of a lower dialkyl ether to yield non-solvated aluminum hydride.

Aluminum hydride is useful as a reducing agent, as a fuel in solid propellants, and as an intermediate. The non-solvated aluminum hydride of this invention when incorporated with oxidizers is capable of being formed into a wide variety of grains, tablets, and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

Although a great number of attempts have been made to prepare non-solvated aluminum hydride, the end result has been the formation of either an impure polymeric product or a solid solvated polymer from which the removal of all of the solvent without decomposition could not be achieved. Finholt et al (JACS, 69, 1199–1203 (1947)) reacted lithium aluminum hydride with aluminum chloride in the presence of diethyl ether and obtained a solid with a variable composition. Although the ratio of hydrogen to aluminum in the solid was 3:1 within experimental error, the total weight of the aluminum and the hydrogen in the solid product was always less than the total weight of the sample, the difference being the weight of the diethyl ether in the solvated compound. It was concluded by Finholt et al., after repeated efforts to remove the ether from the solid product by drying under vacuum at temperatures of up to about 80°C. that the complete removal of the solvent from the aluminum hydride formed by the reaction of lithium aluminum hydride and aluminum chloride in diethyl ether could not be accomplished without loss of hydrogen. Hurd (*Chemistry of the Hydrides*, 1952, John Wiley and Sons, Inc., pages 95–98) present a thorough review of laboratory methods for the preparation of solvated-aluminum hydride. Hurd states that aluminum hydride never has been isolated except in the form of a highly polymerized compound having the general formula $(AlH_3)_x$. Further, Hurd states that lithium aluminum hydride can be reacted with aluminum chloride in ether solution to form lithium chloride and a solution of aluminum hydride and ether and that this solution of aluminum hydride cannot be evaporated to obtain a volatile aluminum hydride. Chizinsky et al, (JACS, 77, 3164–5, (1955)) have described a method for the preparation of non-solvated aluminum hydride. First, they prepared a solution of aluminum hydride in diethyl ether by reaction of lithium aluminum hydride and aluminum chloride. The solution of aluminum hydride was filtered promptly (before polymerization could occur) through sintered glass under nitrogen into an inert liquid (pentane or ligroin were found to be suitable). They state it is essential that the hydride solution be rapidly mixed with a relatively large volume of the inert liquid and that a satisfactory method is to run the solution in a thin film down a wire while the precipitant is vigorously stirred by a magnetic stirrer. On drying the resulting fluffy precipitate under vacuum at room temperature for at least twelve hours a product was obtained which on analysis was shown to correspond to aluminum hydride.

In the method of this invention mercuric chloride, mercurous chloride, ferric chloride, zinc chloride, cupric chloride or cuprous chloride is reacted with an excess of an alkali metal aluminum hydride dissolved in a lower dialkyl ether to yield aluminum hydride, the alkali metal chloride, free mercury or copper and hydrogen. The reaction takes place according to the following equation in which, by way of example, the reaction between cupric chloride and an alkali metal aluminum hydride is shown:

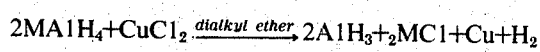

$$2MAlH_4 + CuCl_2 \xrightarrow{dialkyl\ ether} 2AlH_3 + 2MCl + Cu + H_2$$

wherein M is an alkali metal selected from the group consisting of lithium, sodium and potassium. The alkali metal chloride, being insoluble in the lower dialkyl ether, precipitates during the reaction along with the free metal formed and the combined precipitate is removed by any convenient method, such as, by filtration. Hydrogen generated during the reaction is allowed to excape from the reactor and is measured to determine the extent of the reaction. After removal of the insoluble alkali metal chloride and the free metal formed during the reaction, the filtrate is evaporated to dryness under vacuum at room temperature. The dry solid contains the etherated or solvated aluminum hydride product plus the unconverted alkali metal aluminum hydride. Before proceeding with the desolvation step it is preferred to grind the dry solid to a fine powder. The complete removal of ether from the solvated product is accomplished by heating at a temperature ranging from ambient temperature to an elevated temperature of from about 60° to about 150°C. Preferably during this heating step a vacuum or a nitrogen-sweep is employed to facilitate removal of the ether. During the desolvation step the intermediate product is maintained at the elevated temperature for a sufficiently long period of time to insure quantitative elimination of the ether. Depending upon the technique employed, this time will range from about 0.5 to about 20 hours or more. The product remaining after the heat treatment phase contains the aluminum hydride product in non-solvated form together with the unreacted alkali metal aluminum hydride which can then be extracted from the non-solvated product with a lower dialkyl ether. Following the ether wash, the product is dried again, preferably either under vacuum or with the aid of a nitrogen sweep, at room temperature or at slightly higher temperatures. The reaction is essentially quantitative and although some of the non-solvated product is removed in the ether in the final ether wash, this lost product can be recovered by recycling. The in hand yield varies from about 60 to about 85 per cent of the theoretical based on the weight of the metal chloride charged to the reactor.

The temperature of the reaction will generally be from about −25°C. to about +50°C. with the preferred temperature being from about −10°C. to about +32°C.

In carrying out the reaction any of the lower dialkyl ethers can be employed. Suitable lower dialkyl ethers include methyl ether, ethyl ether, n-propyl ether, n-butyl ether, n-amyl ether, methyl ethyl ether, methyl propyl ether, methyl butyl ether, ethyl propyl ether, ethyl butyl ether, propyl butyl ether, isopropyl ether, isobutyl ether, isoamyl ether, methyl isopropyl ether, methyl isobutyl ether, ethyl isobutyl ether, ethyl isopropyl ether, ethyl isobutyl ether, ethyl isoamyl ether, etc. In a like manner any of the lower dialkyl ethers mentioned above are suitable for extraction of the unreacted alkali metal aluminum hydride from the crude product consisting of the alkali metal aluminum hydride and the non-solvated aluminum hydride although those ethers boiling at less than 100°C. are preferred.

In carrying out the reaction it is advantageous to maintain the initial concentration of the alkali metal aluminum hydride at about 0.5 to about 10.0 per cent by weight based on the weight of the lower dialkyl ether employed. The proportion of ether to the reactants not only affects the solubility of the reactants but also the extent of solution of the final product in the reaction mixture and control of the reaction temperature. In the applicants' novel process it has been found that an excess of the alkali metal aluminum hydride must be employed. Although the role of the excess lithium aluminum hydride is not fully understood, it is known that the excess of the alkali metal aluminum hydride participates in the solubilization of the aluminum hydride formed in the reaction and, in addition, it appears to play a significant role in the desolvation step of the applicants' process in that it makes possible the complete removal of the lower dialkyl ether during the desolvation step. It has been found that if the unreacted alkali metal aluminum hydride is removed from the intermediate product containing the etherated or solvated aluminum hydride before the desolvation step it is impossible to remove the ether from the solvated aluminum hydride. The molar ratio of the mercury or copper compound reacted with the alkali metal aluminum hydride can be varied widely from about 0.49 to about 0.17 with the preferred molar ratio being from about 0.49 to about 0.33. Desolvation of the etherated aluminum hydride can be effected over a wide range of conditions with respect to the time and temperature employed. In the initial stages it is sufficient to maintain the intermediate product being desolvated under conditions of ambient temperature while preferably subjecting the material to an inert gas sweep or to a vacuum, however, the latter part of the desolvation step, in which the final quantity of ether is removed from the solvated product, requires temperatures of from about 60°C. to about 150°C. The rate of removal of the ether from the solvated product is dependent on the particle size, exposure of the surface and efficiency of removal of the liberated ether.

The non-solvated aluminum hydride produced by practicing the method of this invention can be employed as ingredients of solid propellant compositions in accordance with general procedures which are well understood in the art, inasmuch as the non-solvated aluminum hydride produced by practicing the present process is readily oxidized using conventional solid oxidizers, such as ammonium perchlorate, potassium perchlorate, sodium perchlorate, ammonium nitrate and the like. In formulating a solid propellant composition employing non-solvated aluminum hydride produced in accordance with the present invention, generally from 10 to 35 parts by weight of non-solvated aluminum hydride and from 65 to 90 parts by weight of oxidizer, such as ammonium perchlorate, are present in the final propellant composition. In the propellant, the oxidizer and the product of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizer and the oxidizable material, the final propellant can also contain an artificial resin, generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided non-solvated aluminum hydride can be admixed with a high solids content solution of a partially condensed urea-formaldehyde or phenol-formaldehyde resin, the proportions being such that the amount of the resin is about 5 to about 10 per cent by weight, based upon the weight of the oxidizer and the non-solvated aluminum hydride. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant compositions, reference is made to U.S. Pat. No. 2,622,277 to Bonnell et al and U.S. Pat. No. 2,646,596 to Thomas et al.

The following examples will serve to further illustrate this invention:

EXAMPLE I

In this experiment the reactor employed was a one liter, three-necked flask, equipped with a magnetic stirrer, an additional funnel, and a gas inlet for nitrogen addition. The reactor was connected to a Dewar-type condenser which, in turn, was connected in series with a Nujol-filled bubble-off, a gas washing tower filled with water and a wet-test meter.

A quantity of lithium aluminum hydride was dissolved in diethyl ether and the resulting solution filtered. The clear filtrate was analyzed and found to contain, on an active hydrogen basis, 0.134 mole of lithium aluminum hydride per 160 ml. of ether. To the reactor flask there was added 160 ml. of the lithium aluminum hydride-diethyl ether solution and the solution was cooled to 0°C. with stirring by means of an ice-water bath. In the next step 475 ml. of diethyl ether in which there was dissolved 0.066 mole of mercuric chloride was slowly added to the reactor. Hydrogen evolution during the reaction as measured by the wet test meter was essentially quantitative based on the amount of mercuric chloride added. After all of the mercuric chloride-diethyl ether solution had been added, the reaction mixture was allowed to stand briefly permitting the insoluble lithium chloride and mercury formed during the reaction to settle to the bottom of the reactor. The supernatant liquid was filtered and the filtrate evaporated to dryness under vacuum. The white crystalline product thus-obtained was ground to a fine powder, dried under vacuum at ambient temperature for 18 hours and then heated at 70°C. under vacuum for 4 hours to complete the final removal of the ether. The maximum vacuum employed was about $10^{-2}$ mm. Hg.. The resulting solid product which contained the non-solvated aluminum hydride product together with the unreacted lithium aluminum hydride was washed with diethyl ether in an amount equal to about 30 ml. of ether per gram of product and then dried for 4.5 hours at 65°–70°C. under vacuum (maximum vacuum about $10^{-2}$ mm. Hg.) a yield of 2.4 grams of non-solvated aluminum hydride (61 per cent of the theoretical quantity) was obtained.

The non-solvated aluminum hydride product was analyzed for aluminum, hydrogen, lithium and chlorine and the following results were obtained:

|  | Al | H | C | Li | Cl |
|---|---|---|---|---|---|
| Calc'd for AlH$_3$: | 89.92 | 10.08 | — | — | — |
| Found: | 84.1 | 9.92 | 1.91 | 1.59 | 0.2 |

EXAMPLES II-IX

A number of additional experiments were conducted according to the procedure described below.

The apparatus employed in Examples II–IX consisted of a 5-liter, three-necked reaction flask equipped with a mechanical stirrer, reflux condenser, thermometer, and a solids addition device which was an Erlenmeyer flask attached to an inlet at the top of the reaction flask. Four liters of diethyl ether was placed in the flask, and 90 g. (2.25 moles) of lithium aluminum hydride (95 per cent LiAlH$_4$) was dissolved in the ether with stirring. The ethereal solution was cooled to 0° to +5°C by means of an ice-water bath. In the next step 271 g. (1 mole) of mercuric chloride was added in small portions while the reaction mixture was stirred and maintained at about 5°C. Following the addition of the mercuric chloride, the mixture was allowed to stand briefly in order to permit lithium chloride and elemental mercury formed during the reaction to precipitate. The resulting supernatant liquid was filtered and the filtrate evaporated to dryness yielding a white crystalline intermediate product containing solvated aluminum hydride and the unreacted lithium aluminum hydride. The intermediate product was desolvated and the non-solvated aluminum hydride isolated in the same manner as described in Example I. In each of these examples a yield of 45–50 g. of non-solvated aluminum hydride was obtained.

The various batches of product were analyzed for carbon and hydrogen. Results obtained are shown in Table 1 which follows.

Table 1

| Example | Product Analysis C | H* |
|---|---|---|
| II | 1.9 | 10.4 |
| III | 1.1 | 9.5 |
| IV | 1.6 | 10.1 |
| V | 1.1 | 9.8 |
| VI | 1.2 | 9.8 |
| VII | 1.1 | 10.0 |
| VIII | 1.1 | 9.6 |
| IX | 1.4 | 10.1 |

* The calculated value for hydrogen in non-solvated aluminum hydride is 10.08.

What is claimed is:

1. A method for the preparation of non-solvated aluminum hydride which comprises (A) reacting a compound selected from the group consisting of mercuric chloride, mercurous chloride, ferric chloride, zinc chloride, cupric chloride and cuprous chloride with an excess of an alkali metal aluminum hydride of the formula:

$$MAlH_4$$

wherein M is an alkali metal selected from the group consisting of lithium, sodium and potassium and in the presence of a lower dialkyl ether of the formula:

$$R_1OR_2 ,$$

wherein $R_1$ and $R_2$ are alkyl radicals having from one to five carbon atoms, the molar ratio of the said compound reacted with the said alkali metal aluminum hydride being within the range of from about 0.49 to about 0.17, (B) separating liquid and solid phases of the resulting reaction mixture, (C) recovering from the liquid phase a solvated aluminum hydride product containing the unreacted alkali metal aluminum hydride, (D) heating the said solvated aluminum hydride product at a temperature of from about 20°C. to about 150°C. and for a period of time sufficient to remove the lower dialkyl ether associated with the aluminum hydride whereby a non-solvated aluminum hydride product containing the unreacted alkali metal aluminum hydride is obtained and (E) recovering the non-solvated aluminum hydride.

2. The method of claim 1 wherein the reaction is carried out at a temperature within the range of from about −25°C. to about +50°C.

3. The method of claim 1 wherein the said alkali metal aluminum hydride is lithium aluminum hydride.

4. The method of claim 1 wherein the said compound is mercuric chloride.

5. The method of claim 1 wherein the said lower dialkyl ether is diethyl ether.

6. The method of claim 1 wherein the concentration of the said alkali metal aluminum hydride initially present in the reaction mixture is from about 0.5 to about 10 per cent by weight based on the weight of the lower dialkyl ether employed.

7. The method for the preparation of non-solvated aluminum hydride which comprises reacting (A) mercuric chloride with an excess of lithium aluminum hydride at a temperature of from about −25° to about +50°C. and in the presence of diethyl ether, the molar ratio of the said mercuric chloride reacted with the said lithium aluminum hydride being from about 0.49 to about 0.17, the concentration of the lithium aluminum hydride initially present in the reaction mixture being from about 0.5 to about 10 weight per cent based on the weight of the diethyl ether employed, (B) separating liquid and solid phases of the resulting reaction mixture, (C) recovering from the liquid phase a solvated aluminum hydride product containing the unreacted lithium aluminum hydride, (D) heating the said solvated aluminum hydride product at a temperature of from about 20°C. to about 150°C. and for a period of time sufficient to remove the diethyl ether associated with the aluminum hydride whereby a non-solvated aluminum hydride product containing the unreacted lithium aluminum hydride is obtained, and (E) recovering the non-solvated aluminum hydride.

* * * * *

UNITED STATES PATENT OFFICE
CERTIFICATE OF CORRECTION

Patent No. 3,821,360　　　　　　　Dated　June 28, 1974

Inventor(s)　Theodore C. Kraus et al.

It is certified that error appears in the above-identified patent and that said Letters Patent are hereby corrected as shown below:

In the heading Item [45] "May 28, 1974" should read -- June 28, 1974 --.

Signed and sealed this 8th day of October 1974.

(SEAL)
Attest:

McCOY M. GIBSON JR.　　　　　　　C. MARSHALL DANN
Attesting Officer　　　　　　　　Commissioner of Patents